United States Patent

Nagata

(10) Patent No.: US 9,161,332 B2
(45) Date of Patent: Oct. 13, 2015

(54) LOCATION ESTIMATION DEVICE AND LOCATION ESTIMATION METHOD FOR ESTIMATING LOCATION OF INTERFERENCE SOURCE

(71) Applicant: FUJITSU LIMITED, Kawasaki-shi, Kanagawa (JP)

(72) Inventor: Nami Nagata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/461,757

(22) Filed: Aug. 18, 2014

(65) Prior Publication Data

US 2015/0099534 A1    Apr. 9, 2015

(30) Foreign Application Priority Data

Oct. 4, 2013 (JP) ................... 2013-209002

(51) Int. Cl.
*H04W 24/00* (2009.01)
*H04W 64/00* (2009.01)
*H04B 15/00* (2006.01)

(52) U.S. Cl.
CPC ............. *H04W 64/006* (2013.01); *H04B 15/00* (2013.01)

(58) Field of Classification Search
CPC ..... H04L 69/16; H04L 69/163; H04L 1/1825; H04W 28/04
USPC ........................................ 455/456.1; 370/236
See application file for complete search history.

(56) References Cited

U.S. PATENT DOCUMENTS

| 2004/0103278 A1* | 5/2004 | Abhishek et al. ............. 713/160 |
| 2011/0280240 A1* | 11/2011 | Yamagaki et al. ............ 370/389 |
| 2014/0022908 A1* | 1/2014 | Ibuki ............................. 370/236 |
| 2014/0204757 A1 | 7/2014 | Ishizaki |
| 2014/0269301 A1* | 9/2014 | Rungta et al. ................. 370/235 |
| 2014/0341026 A1* | 11/2014 | Gahm et al. .................. 370/232 |

FOREIGN PATENT DOCUMENTS

| JP | 2007-295278 | 11/2007 |
| JP | 2013-055451 | 3/2013 |

* cited by examiner

*Primary Examiner* — Don N Vo
(74) *Attorney, Agent, or Firm* — Staas & Halsey LLP

(57) ABSTRACT

A wireless communication network system includes: a location estimation device includes: a processor; and a memory which stores a plurality of instructions, which when executed by the processor, cause the processor to execute: collecting information, for each wireless device in a pair of wireless devices communicating with each other in the wireless communication network, as to the number of occurrences of duplicate reception caused by the data retransmission performed when the reception acknowledgement does not reach the transmitting wireless device; and estimating the location of an interference source of radio wave in a wireless communication network based on the collected information as to the number of occurrences of duplicate reception such that the location of the interference source is closer to one of wireless devices in the pair with a less number of occurrences of duplicate reception than to the other one of the wireless devices in the pair.

15 Claims, 13 Drawing Sheets

FIG. 5

| COMMUNICATION PARTNER DEVICE | NUMBER OF OCCURRENCE OF DUPLICATE RECEPTION |
|---|---|
| WIRELESS DEVICE B | 0 |
| WIRELESS DEVICE C | 2 |
| WIRELESS DEVICE D | 1 |
| ⋮ | ⋮ |

FIG. 8

| RECEPTION SIDE | TRANSMISSION SIDE | NUMBER OF OCCURRENCES OF DUPLICATE RECEPTION |
|---|---|---|
| WIRELESS DEVICE A | WIRELESS DEVICE B | 0 |
| WIRELESS DEVICE A | WIRELESS DEVICE C | 2 |
| WIRELESS DEVICE A | WIRELESS DEVICE D | 1 |
| ⋮ | ⋮ | ⋮ |
| WIRELESS DEVICE B | WIRELESS DEVICE A | 8 |
| WIRELESS DEVICE B | WIRELESS DEVICE D | 0 |
| WIRELESS DEVICE B | WIRELESS DEVICE E | 0 |
| ⋮ | ⋮ | ⋮ |
| WIRELESS DEVICE J | WIRELESS DEVICE K | 0 |
| ⋮ | ⋮ | ⋮ |
| WIRELESS DEVICE K | WIRELESS DEVICE J | 15 |
| ⋮ | ⋮ | ⋮ |

LOCATION ESTIMATION DEVICE AND LOCATION ESTIMATION METHOD FOR ESTIMATING LOCATION OF INTERFERENCE SOURCE

CROSS-REFERENCE TO RELATED APPLICATION

This application is based upon and claims the benefit of priority from the prior Japanese Patent Application No. 2013-209002 filed on Oct. 4, 2013, the entire contents of which are incorporated herein by reference.

FIELD

The embodiments discussed herein are related to a location estimation device, a location estimation method, and a program for estimating a location of a radio wave interference source in a wireless communication network.

BACKGROUND

In recent years, attention has been given to a wireless sensor network system configured such that a plurality of sensors each having a wireless communication function are connected to each other so as to form a communication network. That is, the wireless sensor network system is a system in which, unlike a fixedly built network, an ad-hoc network is built autonomously by sensors. Such a wireless sensor network system finds applications in a device monitoring system in a factory or a plant, an operation management system associated with electric power, gas, waterworks, or the like. Related techniques may be found, for example, in Japanese Laid-open Patent Publication No. 2013-055451.

In such a wireless communication network, there is a possibility that unintended radio wave interference may occur, which may result in a reduction in throughput and/or a reduction in communication quality. The radio wave interference may occur due to causes which may be classified into two types: internal causes in a network; and external causes.

The internal causes originate from a communication collision between wireless devices in the network. Examples of such internal causes include interference that occurs when a plurality of wireless devices operating as hidden terminals start communication at the same time, interference caused by reflection of radio waves radiated by wireless devices, and the like. Related descriptions may be found, for example, in Japanese Laid-open Patent Publication No. 2007-295278.

On the other hand, external causes originate from a radio wave output from an electromagnetic wave source located outside a network. Examples include interference to wireless communication in a network by radio waves radiated by an external device in an electrical substation, an electric power transmission/distribution system, an electric power tower, a railroad, a factory, a base station (radio antenna) of a portable telephone system, or the like. In recent years, wireless communication devices have become popular, which accordingly results in a quick increase in communication failures caused by radio wave interference.

SUMMARY

In accordance with an aspect of the embodiments, a wireless communication network system includes: a plurality of wireless devices, each device operates as one of a transmitting wireless device or a receiving wireless device; wherein the receiving wireless device configured to receive data from the transmitting wireless device and to return a reception acknowledgement signal to the transmitting wireless device after receiving the data; wherein the transmitting wireless device configured to transmit the data to the receiving wireless device and to retransmits the data to the receiving wireless device when the reception acknowledgement signal does not reach the transmitting wireless device; a location estimation device includes: a processor; and a memory which stores a plurality of instructions, which when executed by the processor, cause the processor to execute: collecting information, for each wireless device in a pair of wireless devices communicating with each other in the wireless communication network, as to the number of occurrences of duplicate reception caused by the data retransmission performed when the reception acknowledgement does not reach the transmitting wireless device; and estimating the location of an interference source of radio wave in a wireless communication network based on the collected information as to the number of occurrences of duplicate reception such that the location of the interference source is closer to one of wireless devices in the pair with a less number of occurrences of duplicate reception than to the other one of the wireless devices in the pair with a larger number of occurrences of duplicate reception.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 5 illustrates an example of a format of data acquired by the wireless device illustrated in FIG. 3.

FIG. 8 illustrates an example of a format of data acquired by the server illustrated in FIG. 6.

FIG. 12A is a diagram in which numbers of occurrences of duplicate reception are represented on a topological map of a wireless communication network, and FIG. 12B is a diagram illustrating a range in which an interference source is estimated to be located.

DESCRIPTION OF EMBODIMENTS

Figure 1:
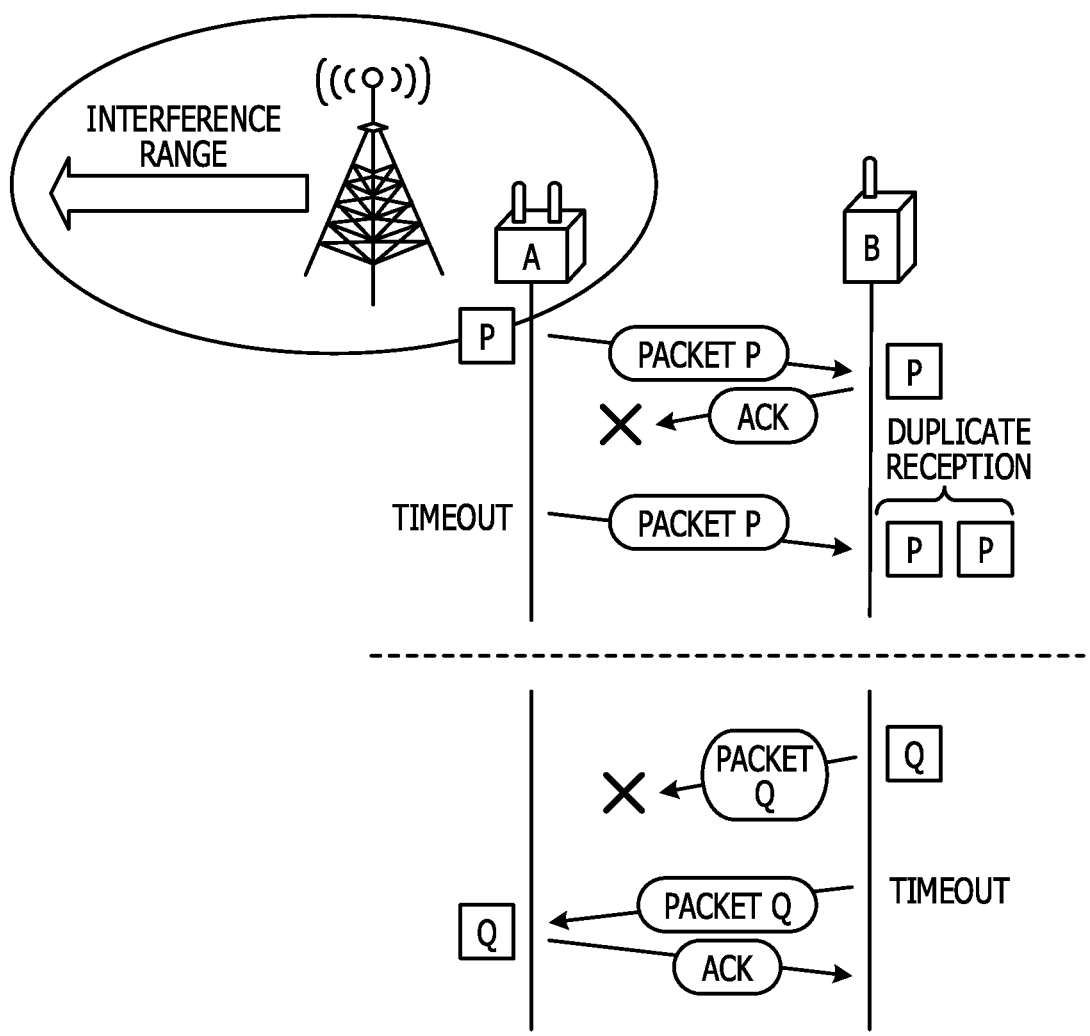
FIG. 1 is a diagram illustrating a method of estimating an interference source according to an embodiment.

A location estimation device, a location estimation method, and a program, for estimating a location of an interference source according to embodiments are described below with reference to drawings. Note that the embodiments described below are given merely by way of example but not limitation. Various modifications of the embodiments are possible, and many other techniques, which are not described in the embodiments, may be applied. That is, various modifications (including, for example, a combination of embodiments) are possible without departing from the scope of the embodiments.

1. Outline

An interference source location estimation device, a location estimation method, and a program according to the present embodiments are configured to estimate a location of a radio wave interference source in a wireless communication network including a plurality of wireless devices. The location of the interference source is estimated based on numbers of occurrences of duplicate reception that occur in communication on respective links included in a wireless communication network.

Herein the "wireless communication network" may be a wireless sensor network (WSN), a portable telephone communication network, a wireless local area communication network, or the like. A specific example of the wireless sensor network is a smart meter network including smart meters. The smart meter is a meter having a communication function applied to an electric power meter, a gas meter, a water meter, or the like installed in a consumer's place. Examples of wireless devices forming a wireless communication network may include, in addition to the smart meter described above, a sensor having a wireless communication function, a wireless router configured to relay wireless communication, a wireless base station, a wireless server, and the like.

The wireless communication network is configured to have at least a data automatic repeat request (ARQ) function. In the ARQ function, when an acknowledgement (ACK) signal is returned to a device on a data transmission side from a device on a data reception end, if the ACK signal does not reach the device on the data transmission side, the device on the data transmission side retransmits the data to the device on the data reception side. For example, in communication between two wireless devices, when data transmitted from a wireless device on a data transmission side is received by a wireless device on a data transmission side, if the received data is not collapsed, the wireless device on the data reception side returns an ACK signal to the wireless device on the data transmission side.

On the data transmission side, in a case where the ACK signal returned from the data reception side is received within a predetermined period of time before timeout occurs after the data is transmitted, it is determined that the data is correctly transmitted. In this case, retransmission of the same data is not performed. On the other hand, in a case where the ACK signal is not received in the predetermined period before the timeout occurs, the wireless device on the data transmission side determines that the data is not transmitted correctly, and the wireless device on the data transmission side retransmits the same data to the data reception side. In the communication system in which the transmission is controlled in the above-described manner, when there is a possibility that some data is not correctly transmitted, the same data is retransmitted from the transmission side, which allows an increase in reliability in data transmission.

Examples of interference sources include an entity (electromagnetic wave output device) that radiates an interference electromagnetic wave that interferes with communication in a wireless communication network, and an entity (electromagnetic wave reflection device) that reflect an interference electromagnetic wave. Specific examples of interference sources include a power supply tower, a communication antenna, a power transmission system, a power substation, a large-scale building, a factory, a railroad, a highway, and other elevated structures. Examples of interference sources also include a base station of a portable telephone system, a radio antenna, a radio wave tower, and a transmission/reception facility in a wireless communication network. Examples of interference sources further include a home-use wireless interphone, a home-use wireless router, a cordless telephone, a microwave oven, and the like. Note that a wireless device or a wireless communication facility in a wireless communication system different from the present wireless communication system according to the embodiment may also be an interference source. For example, a wireless base station in a portable telephone system or a wireless base station in a wide area wireless communication system may be an interference source. Interference radio waves output from various interference sources such as those described above vary in strength and interference range.

The number of occurrences of duplicate reception refers to the number of times that duplicate data is received by a device on a receiving side in communication (link) between a pair of wireless devices. That is, this indicates the number of times that after data is correctly received by the data reception side, the same data is retransmitted from the data transmission side and is again received correctly by the data reception side. For example, when the data transmission side does not receive an ACK signal from the data reception side within a predetermined period of time before timeout occurs (when an ACK transmission failure occurs), if the transmission side retransmits the same data, then the result is an increase in the number of occurrences of duplicate reception at the data reception side.

Referring to FIG. 1, the increase in the number of occurrences of duplicate reception caused by interference is described below. In the following discussion, it is assumed by way of example that a wireless device A is located within an interference range of an interference source and a wireless device B is located outside the interference range, and a discussion is given below as to the number of occurrences of duplicate reception that may occur in communication in such a situation between the wireless devices A and B. In a case where a packet P is transmitted from the wireless device A to the wireless device B, the wireless device B does not receive interference by the interference source and thus there is a high probability that the wireless device B correctly receives the packet P. In response to receiving the packet P, the wireless device B returns an ACK signal to the wireless device A to notify that the packet P has been received correctly. On the other hand, the wireless device A receives interference by the interference source, and thus there is a possibility that the ACK signal is not correctly received by the wireless device A. When that is the case, the wireless device A retransmits the packet P to the wireless device B after timeout occurs. In this case, the wireless device B receives the duplicate packet P, which results in an increase in the number of occurrences of duplicate reception at the wireless device B in the communication with the wireless device A.

On the other hand, in a case where a packet Q is transmitted from the wireless device B to the wireless device A, the wireless device A may receive interference by the interference source, which results in a possibility that the packet Q is not correctly received by the wireless device A. When that is the case, the wireless device B retransmits the packet Q to the wireless device A when timeout occurs. In this situation, if the packet Q is correctly received by the wireless device A, the wireless device A returns an ACK signal to the wireless device B. Because the wireless device B does not receive interference by the interference source, the ACK signal is correctly received by the wireless device B.

That is, in the case where the packet Q is correctly received by the wireless device A, the packet Q is not retransmitted by the wireless device B. The packet Q retransmitted by the wireless device B when the packet Q is not correctly received by the wireless device A does not cause a duplicate reception of a packet to occur, and thus no increase occurs in the number of occurrences of duplicate reception at the wireless device A in communication with the wireless device B. As may be seen from the above discussion, the number of occurrences of duplicate reception is asymmetric between the reception side and the transmission side unless the reception side and the transmission side receive equal influence of radio wave interference in communication. The number of occurrences of duplicate reception does not necessarily depend on the degree of influence of radio wave interference on wireless devices. However, by comparing the number of occurrences of duplicate reception between wireless devices on reception and transmission sides, it is allowed to determine which device receives more significant influence of radio wave interference. Thus, based on the asymmetry of communication quality such as that described above, it is allowed to determine a direction in which radio wave interference occurs on a wireless link (that is, a direction in which an interference source is located with respect to the wireless link).

For example, in a case where in communication between a pair of wireless devices, there is a difference in the number of occurrences of duplicate reception between one wireless device and the other wireless device in the pair, it is allowed to estimate that a wireless device having a less number of occurrences of duplicate reception is located closer to an interference source than the other wireless device having a larger number of occurrences of duplicate reception is. When the direction is taken along a link of the pair of wireless devices, the direction toward the interference source is given not by a direction toward the wireless device having a larger number of occurrences of duplicate reception but by a direction toward the wireless device having a less number of occurrences of duplicate reception.

Note that the number of occurrences of duplicate reception is compared between two cases: a first case in which the number of occurrences of duplicate reception that occurs when one wireless device operates as a wireless device at the data transmission side and the other wireless device operates a wireless device at the data reception side; and a second case in which conversely the number of occurrences of duplicate reception that occurs when the other wireless device operates as a wireless device at the data transmission side and the one wireless device operates as a wireless device at the data reception side. In the example illustrated in FIG. 1, the number of occurrences of duplicate reception occurring at the wireless device B when the wireless device B receives data transmitted from the wireless device A is greater than the number of occurrences of duplicate reception occurring at the wireless device A when the wireless device A receives data transmitted from the wireless device B. Thus, it is estimated that the interference source is located closer to the wireless device A than to the wireless device B.

More specifically, when the region in which the wireless devices A and B are located is divided into two sides by a plane (an equidistance plane) which is a set of points located at equal distance from both wireless devices A and B, it is estimated that the interference source is located on the same side where the wireless device A having the less number of occurrences of duplicate reception is located. Furthermore, it is allowed to estimate that the greater the difference in the number of occurrences of duplicate reception between two wireless devices, the greater the difference in the degree of influence of interference between the wireless devices A and B. That is, the greater the difference in the number of occurrences of duplicate reception between the wireless devices A and B, the greater the distance of the interference source to the equidistance plane (that is, either the distance between the interference source and the wireless device A is small or the distance between the interference source and the wireless device B is large).

2. Wireless Communication Network

Figure 2:
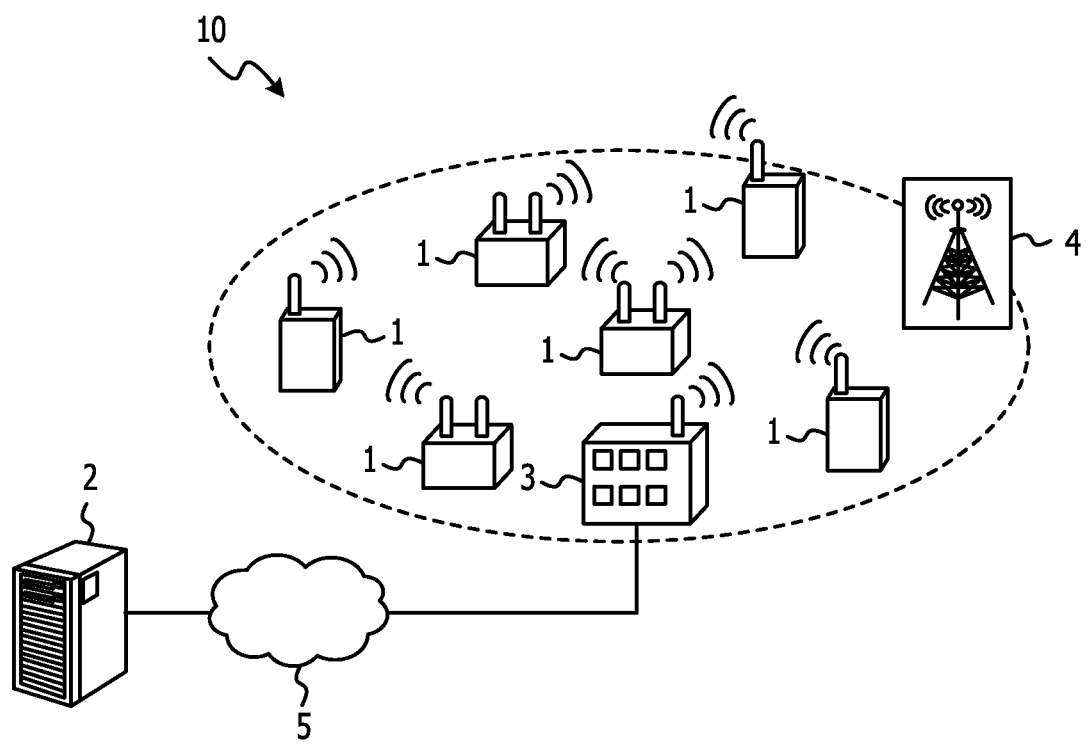
FIG. 2 is a diagram illustrating by way of example a configuration associated with a wireless communication network and a location estimation device according to an embodiment.

FIG. 2 illustrates an example of a wireless sensor network (hereinafter referred to as a wireless communication network) 10 according to an embodiment. The wireless communication network 10 includes a plurality of wireless devices capable of transmitting/receiving data to/from each other. The wireless communication network 10 is, for example, a multihop ad-hoc network in which nodes play equal roles in communication with each other. More specifically, the wireless communication network 10 includes smart meters (hereinafter referred to as wireless devices) 1 each functioning as a sensor terminal, and a base station 3 functioning as a managing terminal (gateway terminal).

The wireless device 1 is, for example, a meter reading device for use in an infrastructure facility such as an electric power meter, a gas meter, a water meter, or the like in which a wireless communication function is provided such that the wireless device 1 has a function of automatically reading a meter as to the amount of consumption of electric power, gas, water or the like in a consumer's place (a company, home) and/or a function of remotely controlling a switch. Each wireless device 1 functions as a node on the radio communication network 10 which may include one base station 3 and a few ten to a few thousand wireless devices 1 forming an ad-hoc network.

The base station 3 serves as a manger terminal that collects meter reading information from the respective wireless devices 1 and transmits the collected information to an electric power or gas supply company. The base station 3 is configured to communicate with a not-illustrated managing system of the electric power or gas supply company via a wired or wireless network 5 including the Internet, a portable telephone wireless communication network, and/or other digital wireless communication networks. To estimate the location of the radio wave interference source 4 in the radio communication network 10, a monitoring server 2 is provided on the network 5. The monitoring server 2 has a function of estimating or determining the location of the interference source 4 based on the information as to the communication state of the radio communication network 10. Note that there is no particular restriction on the location where the monitoring server 2 is installed. For example, the monitoring server 2 may be installed in the radio communication network 10.

2-1. Wireless Device

Figure 3:
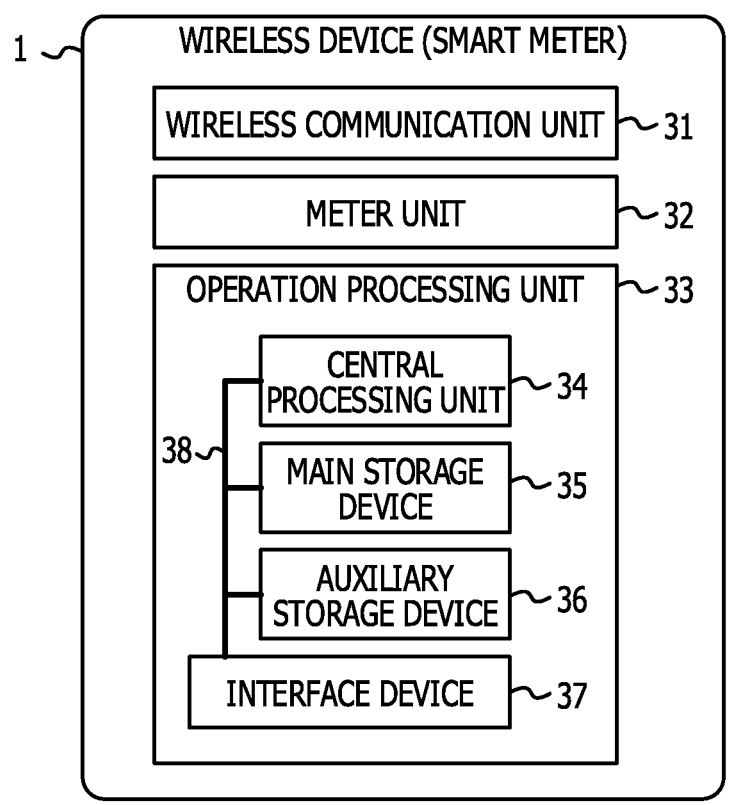
FIG. 3 is a block diagram illustrating by way of example a configuration of a wireless device (smart meter) included in the wireless communication network illustrated in FIG. 1.

FIG. 3 is a block diagram illustrating an example of a configuration of the wireless device 1 having a function of reading a meter as to electric power consumption. The wireless device 1 is interposed on an electric power cable extending into the consumer's place. The wireless device 1 includes a wireless communication unit 31, a meter unit 32, and an operation processing unit 33.

The wireless communication unit 31 is a communication device according to a particular communication protocol. Devices with which the wireless device 1 communicates include not only other wireless devices 1 and the base station 3 in the wireless communication network 10 but also a device related to a home energy management system (HEMS). The frequency band used in the wireless communication may be, for example, a 2.4 GHz band, a 5 GHz band, a 900 MHz band, or the like. Specific examples of devices related to the HEMS includes a solar power generator, a battery, an air conditioner, a water heater, an electric car, a hybrid car, and the like.

The wireless communication unit 31 transmits data to a destination by a multihop communication. For example, meter reading information read by each wireless device 1 is transmitted in a bucket brigade manner to the base station 3 via the wireless communication network 10. After meter reading information from various wireless devices 1 is collected at the base station 3, the meter reading information is transmitted to the management system of the supply company via the arbitrary network 5.

The wireless communication unit 31 is configured to have an automatic data retransmission function. That is, in communication with another communication device, in a case where data is correctly transmitted from a device on a transmission side to a device on a reception side, an ACK signal is returned from the device on the reception side to the device on the transmission side. On the transmission side, in a case where the ACK signal transmitted from the receiving side is received in a predetermined period of time before timeout occurs after the data is transmitted from the device on the transmission side, it is determined that the data has been correctly transmitted. On the other hand, in a case where the timeout period has elapsed without receiving the ACK signal from the device on the reception side, it is determined that the data has not been correctly transmitted, and the same data is retransmitted to the device on the reception side.

The meter unit 32 is a measurement device configured to measure or detect power consumption in a consumer's place in which the wireless device 1 is installed, and provide or display measured/detected information to the consumer. The power consumption is detected by measuring a voltage and a current on a power supply cable on which the wireless device 1 is interposed. The meter unit 32 also acquires, via the wireless communication unit 31, information in terms of a usage state of the device related to the HEMS. This makes it possible to provide information to the consumer as to, for example, a ratio of electric power consumed by the specific one of devices related to the HEMS to the total power consumption.

The operation processing unit 33 is a computer including a processor such as a central processing unit (CPU), a micro processing unit (MPU), or the like, a read only memory (ROM), a random access memory (RAM), an application specific integrated circuit (ASIC), an input/output interface, and the like. The operation processing unit 33 has a function of measuring or detecting a communication state of the wireless device 1, storing the measured/detected information in terms of the communication state, and transmitting the information to the monitoring server 2.

Inside the operation processing unit 33, there are disposed a central processing unit 34, a main storage device 35, an auxiliary storage device 36, and an interface device 37, which are connected to each other via a bus 38 such that they are allowed to communicate with each other. The central processing unit 34 is a processor including a control unit (control circuit), an operation/calculation unit (operation/calculation circuit), a cache memory (set of registers), and the like. The main storage device 35 is a memory such as the RAM, the ROM, or the like for storing a program and intermediate data. The auxiliary storage device 36 is a memory for storing a program and data for a longer period than by the main storage device 35. The auxiliary storage device 36 is, for example, a semiconductor memory such as a flash memory, a ferroelectric memory, or the like. The interface device 37 serves as an input/output interface between the operation processing unit 33 and an external device.

Figure 4:
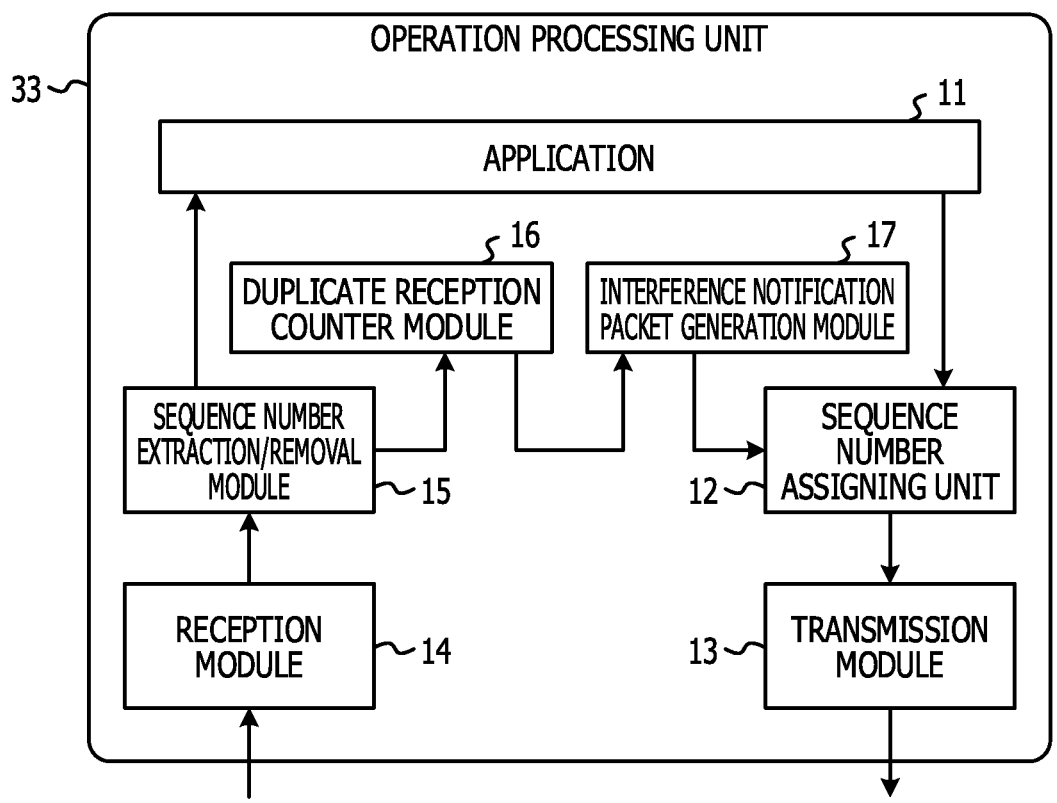
FIG. 4 is a diagram illustrating functions of the wireless device illustrated in FIG. 3.

FIG. 4 is a block diagram illustrating a content of a process performed by the operation processing unit 33. The content of the process is stored in the form of, for example, an application program in the auxiliary storage device 36. The application program is loaded into a memory space in the main storage device 35 is executed. To realize various functions associated with the content of the process, the program includes an application module 11, a sequence number assigning module 12, a transmission module 13, a reception module 14, a sequence number extraction/removal module 15, a duplicate reception counter module 16, and an interference notification packet generation module 17.

The application module 11 is an arbitrary application program. The application module 11 may include, for example, a control program associated with communication between wireless devices 1, a processing program associated with information of power consumption measured or detected by the meter unit 32, and/or a processing program associated with information transmitted from a device related to the HEMS. When data processed by the arbitrary application module 11 is to be transmitted to another wireless device 1, the data is input to the sequence number assigning module 12.

When the sequence number assigning module 12 receives, from the application module 11 or the like, the data to be transmitted, the sequence number assigning module 12 divides the data into a plurality of pieces of unit data (data packets or the like each including a unit amount of data, for example, 1 byte data), and assigns sequence numbers to the respective pieces of unit data. The sequence number is a number indicating an order of data to be transmitted or a number used in controlling a window or the like. Note that one sequence number is assigned to one piece of unit data. The sequence number is given so as to be incremented by one according to the order of the unit data. Therefore, on the data reception side, it is possible to determine whether correct data is received, by checking the consistency in terms of the consecutiveness of the sequence numbers assigned to the received respective pieces of unit data.

The transmission module 13 transmits the unit data with the sequence number assigned by the sequence number assigning module 12. The unit data is transmitted to the wireless communication unit 31 via the transmission module 13 and output as a radio signal from an antenna. The reception module 14 receives a radio signal transmitted from one of the other wireless devices 1 via the wireless communication unit 31. Note that the unit data received here is attached with a sequence number assigned by the one of the other wireless devices 1.

The sequence number extraction/removal module 15 extracts the sequence number assigned to the unit data received by the reception module 14 and also extracts information associated with a sender. Based on the consistency in terms of the consecutiveness of the sequence number of the received unit data, it is determined whether correct data is received. For example, if the received data has a correct consecutive value following the sequence numbers of already received data, it is determined that correct data is received.

In response to receiving the correct data, the wireless communication unit 31 performs a control process to return an ACK signal to the sender. The sequence number and the information of the sender extracted by the sequence number extraction/removal module 15 are transmitted to the duplicate reception counter module 16. On the other hand, after the sequence number and the like are removed from the unit data, the resultant unit data is transmitted to the application module 11 and subjected to proper processing depending on the content of the application module 11.

The duplicate reception counter module 16 counts occurrences of duplicate sequence numbers extracted by the sequence number extraction/removal module 15 thereby determining the number of occurrences of duplicate reception. More specifically, in the present embodiment, when duplicate sequence numbers are extracted in a predetermined period of time, it is determined that duplicate reception has occurred. For example, in a case where there are two duplicate sequence numbers, it is determined that the number of occurrences of duplicate reception is one. On the other hand, in a case where there are four duplicate sequence numbers, it is determined that the number of occurrences of duplicate reception is three. The number of occurrences of duplicate reception is cumulatively added individually for each wireless device 1 of interest.

FIG. 5 illustrates an example of a format of data of the count of the number of occurrences of duplicate reception. In the example illustrated in FIG. 5, the counted number of occurrences of duplicate reception in communication with a wireless device B is 0, the counted number for a wireless device C is 2, and the counted number for a wireless device D is 1. Using this data format, the duplicate reception counter module 16 stores in the auxiliary storage device 36 the counted number of occurrences of duplicate reception in relation with each wireless device 1 serving as a communication partner device.

The interference notification packet generation module 17 generates an interference notification packet to notify the monitoring server 2 of the data stored in the auxiliary storage device 36 in terms of the counted number of occurrences of duplicate reception in relation with each wireless device 1. Note that data is generated to represent the number of occurrences of duplicate reception in relation to each target communication device such as that illustrated in FIG. 5, and the data representing the above information is sent to the sequence number assigning module 12, which in turn assigns a sequence number thereto and transfers the resultant data to the transmission module 13. The interference notification packet is output from the transmission module 13 and transmitted to the monitoring server 2 via the base station 3 in the wireless communication network 10.

2-2. Monitoring Server

Figure 6:
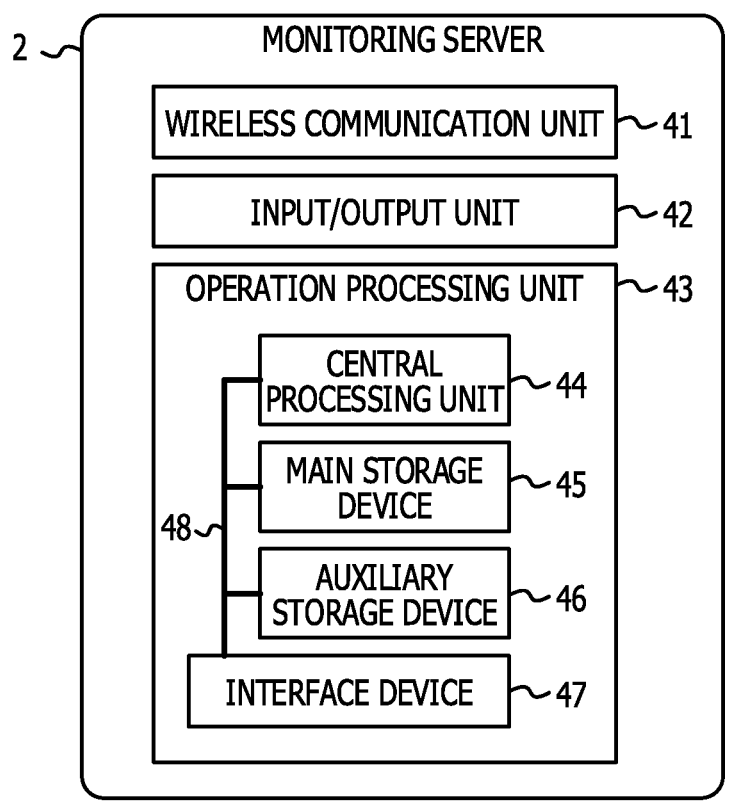
FIG. 6 is a block diagram illustrating by way of an example a configuration of a server (monitoring server) included in the wireless communication network illustrated in FIG. 1.

FIG. 6 is a block diagram illustrating by way of example a configuration of the monitoring server 2 (location estimation device) having a function of estimating the location of the interference source. The monitoring server 2 includes a communication unit 41, an input/output unit 42, and an operation processing unit 43.

The communication unit 41 is a communication device configured to perform communication according to a predetermined communication protocol and provides a communication function to the monitoring server 2. The interference notification packet output from each wireless device 1 is, for example, transferred from the base station 3 to the monitoring server 2 via the network 5 and is input to the operation processing unit 43 via the communication unit 41. In a case where the monitoring server 2 is disposed within the wireless communication network 10, the communication unit 41 may be a communication device similar to the wireless communication unit 31 of the wireless device 1.

The input/output unit 42 serves to input and output information from or to an input/output device connected to the monitoring server 2. Specific examples of the input/output device include a keyboard and/or a mouse in operation inputting to the operation processing unit 43, and a monitor, a display, a speaker, and/or a printer used in outputting a result of processing performed by the operation processing unit 43.

The operation processing unit 43 is, as with the operation processing unit 33 of the wireless device 1, a computer including a processor, a ROM, a RAM, an ASIC, an input/output interface and the like. The operation processing unit 43 performs a calculation to estimate a location of a radio wave interference source based on the information associated with the communication state of the wireless device 1.

Inside the operation processing unit 43, there are disposed a central processing unit 44, a main storage device 45, an auxiliary storage device 46, and an interface device 47, which are connected to each other via a bus 48 such that they are allowed to communicate with each other. The central processing unit 44 is a processor including a control unit (control circuit), an operation/calculation (operation/calculation unit), a cache memory (set of registers), and the like.

The main storage device 45 is a memory such as the RAM, the ROM, or the like for storing a program and intermediate data. The auxiliary storage device 46 is a memory for storing a program and data for a longer period than by the main storage device 45. The auxiliary storage device 46 is, for example, a hard disk drive (HDD), a solid state driver (SSD), a removable medium driver, a semiconductor memory such as a flash memory, a ferroelectric memory, or the like. The interface device 47 serves as an input/output interface between the operation processing unit 43 and an external device.

Figure 7:
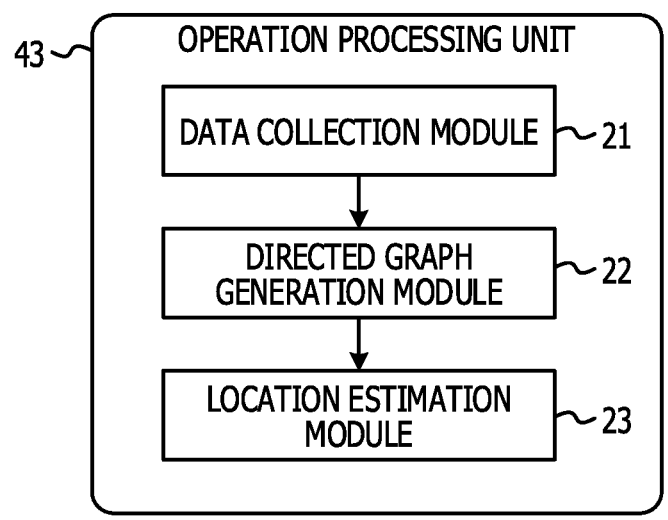
FIG. 7 is a block diagram illustrating functions of the server illustrated in FIG. 6.

FIG. 7 is a block diagram illustrating a content of a process performed by the operation processing unit 43. The content of the process is stored in the form of, for example, an application program in the auxiliary storage device 46 or a removable medium. The application program is loaded into a memory space in the main storage device 45 is executed. To realize various functions associated with the content of the process, the program includes a data collection module 21 (collection unit), a directed graph generation module 22 (generation unit), and a location estimation module 23 (estimation unit).

The data collection module 21 collects information individually for each wireless device 1 as to the number of occurrences of duplicate reception in communication between wireless devices 1 based on the interference notification packet transmitted from a wireless device 1. In the present example, the number of occurrences of duplicate reception is collected for each of all possible combinations of wireless devices 1 in the radio communication network 10. Alternatively, the number of occurrences of duplicate reception is collected for particular wireless devices 1 detected by a known method as being in a low communication state.

FIG. 8 illustrates an example of a format of data of the collection of the number of occurrences of duplicate reception for various wireless devices. In a communication using the same wireless link (that is, for a combination of wireless devices at reception and transmission sides), the number of occurrences of duplicate reception may be different depending on the direction in which information is transmitted along the wireless link. For example, as illustrated in FIG. 8, in a wireless link between a wireless device A and a wireless device B, the number of occurrences of duplicate reception is 0 in a direction in which the wireless device A is on the reception side and the wireless device B is on the transmission side, while in the same wireless link the number of occurrences of duplicate reception is 8 in a direction in which the wireless device B is on the reception side and the wireless device A is on the transmission side.

As described above, the number of occurrences of duplicate reception may be asymmetric in each wireless link. The data collection module 21 collects the number of occurrences of duplicate reception at each wireless device 1 in communication with each communication partner device using the above-described format, and stores the resultant collected data in the auxiliary storage device 46. In a case where the wireless communication network 10 includes n wireless devices 1 in total, the maximum number of records in terms of the number of occurrences of duplicate reception is given by the total number of permutations of two different wireless devices 1 while taking into account the order of selection, and thus given as n(n−1).

The directed graph generation module 22 generates a topological map corresponding to a connection state of the wireless communication network 10 based on the data associated with the number of occurrences of duplicate reception stored in the auxiliary storage device 46. Note that the topological map is generated in the form of a "directed graph". More specifically, in the present description, the directed graph represents a data structure of the data of the number of occurrences of duplicate reception according to a model in which each wireless device 1 is represented by a node and a relation between two nodes is represented by an arrow ling. The directed graph may be displayed graphically on an output device (for example, a display) of the monitoring server 2, or may be stored as data internally in the monitoring server 2. That is, the topological map or the directed graph may or may not be visually represented.

The directed graph generation module 22 checks the number of occurrences of duplicate reception at each wireless device 1 in each pair of wireless devices 1 (that is, in each wireless link) to determine which one of the wireless devices 1 in the pair on reception and transmission sides is influenced by the interference source 4. In this determination, it is assumed that the interference source 4 imposes a weak influence on a wireless device 1 having a larger number of occurrences of duplicate reception while the interference source 4 imposes a strong influence on the other wireless device 1 having a smaller number of occurrences of duplicate reception.

The directed graph generation module 22 connects two nodes with an arrow on the directed graph such that the arrow points to a wireless device 1 receiving a stronger influence by the interference source 4. That is, the two nodes are connected with the arrow extending from one wireless device 1 having a greater number of occurrences of duplicate reception to the other wireless device 1 having a smaller number of occurrences of duplicate reception. As a result, the direction of the arrow between two nodes corresponds to a direction toward the interference source 4 on the wireless link.

Figure 9:
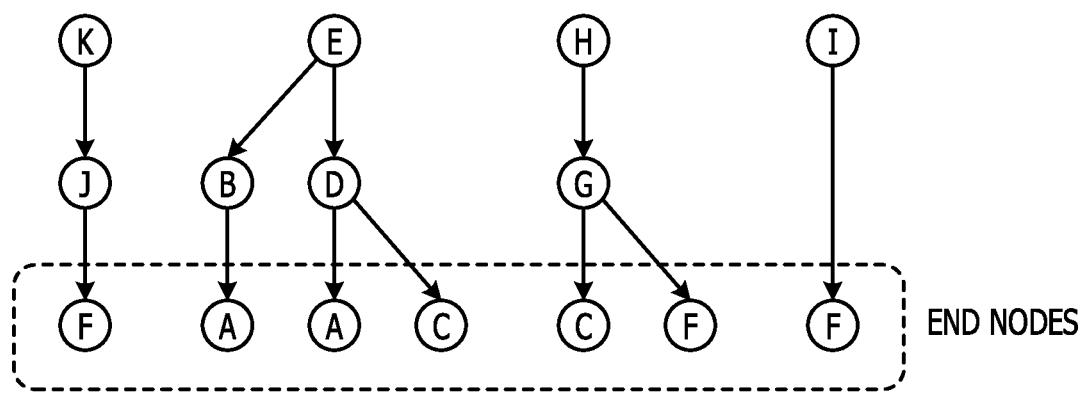
FIG. 9 illustrates an example of a directed graph generated by the server illustrated in FIG. 6.

In the example illustrated in FIG. 8, in communication between a wireless device J and a wireless device K, the number of occurrences of duplicate reception when the wireless device J receives data from the wireless device K is 0, while the number of occurrences of duplicate reception when the wireless device K receives data from the wireless device J is 15. Thus, in this wireless link, the number of occurrences of duplicate reception is greater at the wireless device K and smaller at the wireless device J, that is, wireless device J<wireless device K. Therefore, the directed graph generation module 22 connects the nodes corresponding to the wireless devices J and K with an arrow extending from the wireless device K to the wireless device J. The other nodes are connected with arrows in a similar manner such that each arrow extends from a wireless device having a larger number of occurrences of duplicate reception to a wireless device having a smaller number of occurrences of duplicate reception. By performing the above-described operation repeatedly, the directed graph such as that illustrated in FIG. 9 is generated.

In a case where a wireless link receives substantially no influence from the interference source 4, the number of occurrences of duplicate reception has a small value (for example, 0 or 1) on both reception and transmission sides. Therefore, in a case where the number of occurrences of duplicate reception is smaller than a predetermined value (for example, 5) at both wireless devices on reception and transmission sides, it may be allowed to determine that the nodes are located far from the interference source 4. In a case where the interference source 4 is located close to a wireless link, there is a possibility that the influence of interference is similar between wireless devices on reception and transmission sides. Therefore, in a case where the difference in the number of occurrences of duplicate reception is smaller than a predetermined value (for example, 3), the nodes corresponding to these wireless devices may not be connected with an arrow link.

The location estimation module 23 estimates the location of the interference source 4 based on the information about the number of occurrences of duplicate reception. For each pair of wireless devices 1, the estimation is performed while assuming that the location of the interference source 4 is closer to a wireless device 1 having a less number of occurrences of duplicate reception than to the other wireless device 1 having a larger number of occurrences of duplicate reception. That is, on the directed graph generated by the directed graph generation module 22, it is estimated that a node pointed to by an arrow is closer to the interference source 4 than the other node from which the arrow extends is to the interference source 4. In the present embodiment, the location estimation module 23 estimates an area in which the interference source 4 exits based on the location of a wireless device 1 corresponding to an end node on the directed graph. In the example of the directed graph illustrated in FIG. 9, it is estimated that the wireless device A, the wireless device C, and the wireless device F corresponding to end nodes are located close to the interference source 4.

3. Flow Chart

Figure 10:
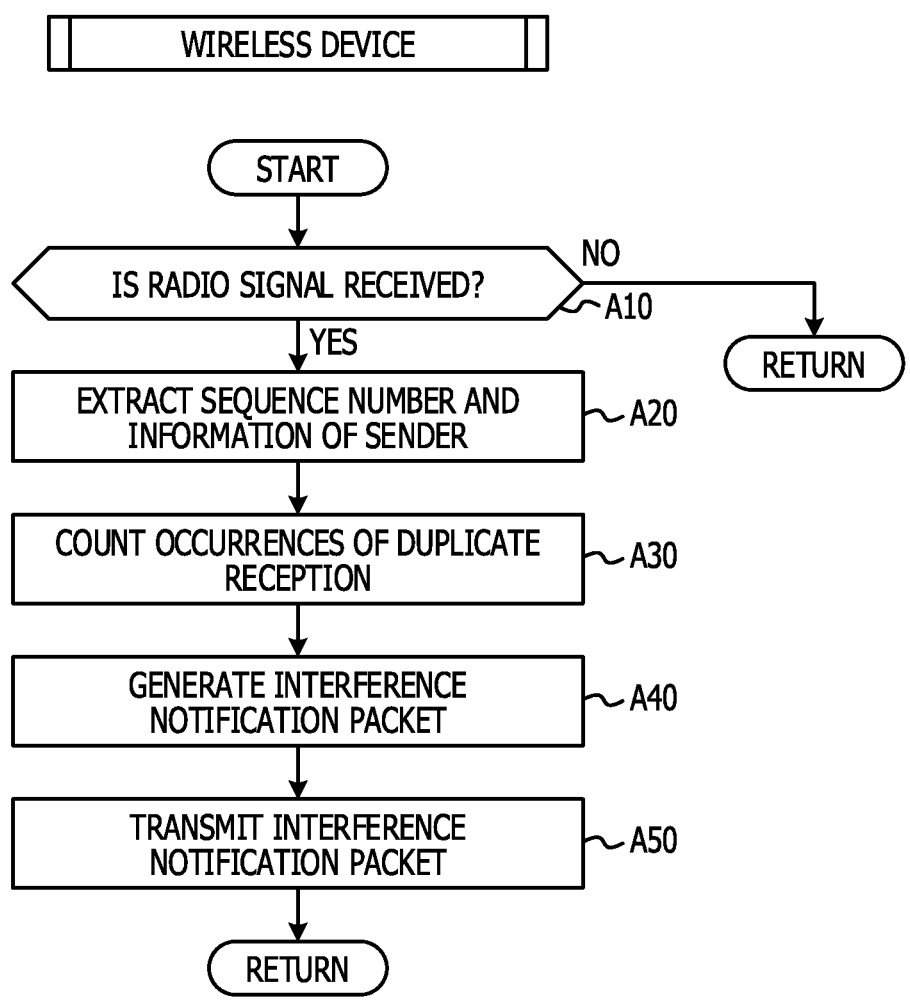
FIG. 10 is a flow chart illustrating by way of example a control procedure by the wireless device illustrated in FIG. 3.
Figure 11:
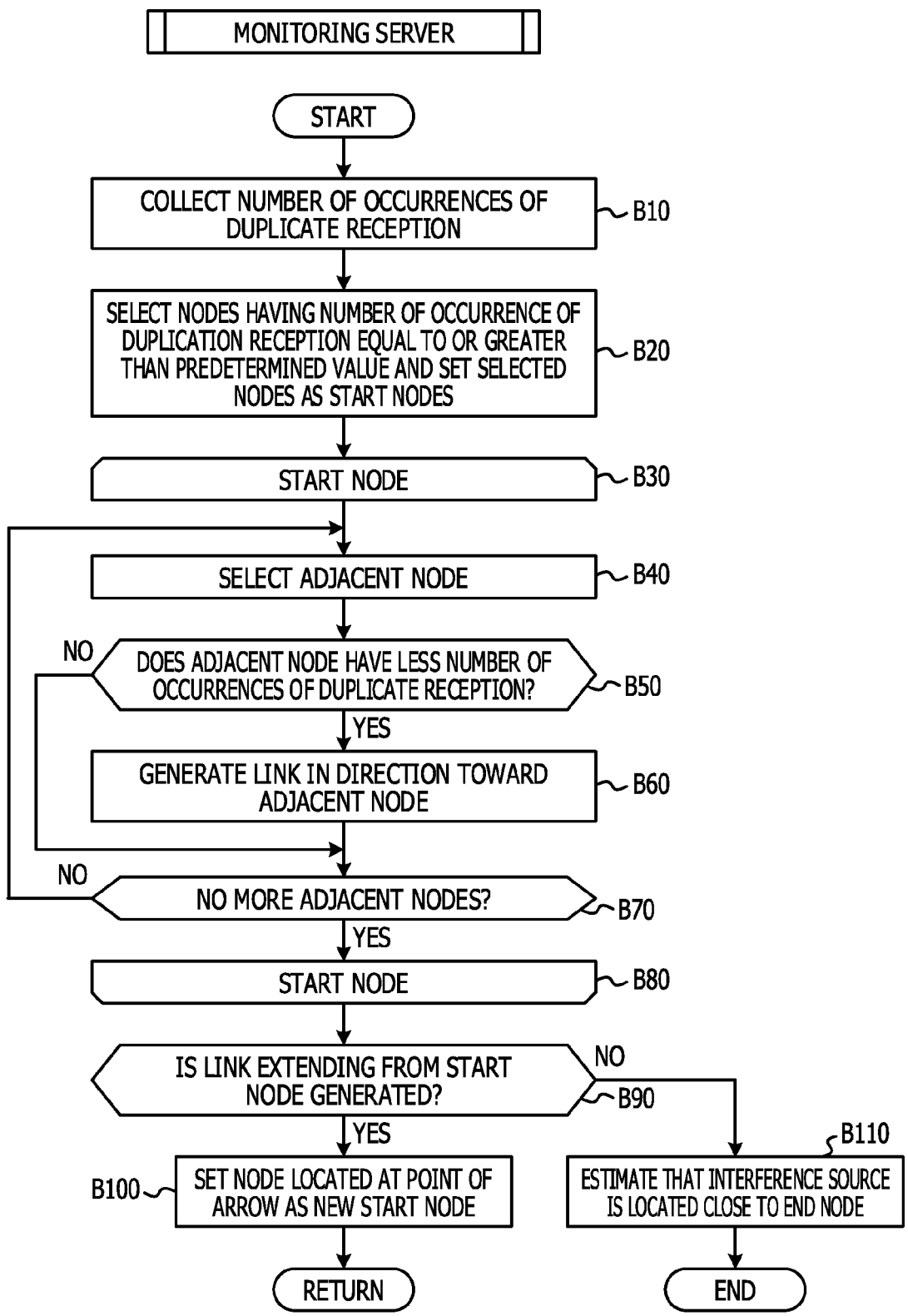
FIG. 11 is a flow chart illustrating by way of example a control procedure by the server illustrated in FIG. 6.

FIG. 10 is a flow chart illustrating a control procedure of counting the number of occurrences of duplicate reception at a wireless device 1. This flow corresponds, for example, to a control procedure by an application program stored in the auxiliary storage device 36 of the operation processing unit 33 and executed by the operation processing unit 33. FIG. 11 is a flow chart illustrating a procedure of a method of estimating the location of the interference source 4 by the monitoring server 2. This flow corresponds, for example, to a control procedure by an application program stored in the auxiliary storage device 46 of the operation processing unit 43 or a removable medium and executed by the operation processing unit 43.

3-1. Counting the Number of Occurrences of Duplicate Reception

In a step A10 in FIG. 10, a determination is performed as to whether a radio signal transmitted from another wireless device 1 via the wireless communication unit 31 is received. For example, it is determined whether unit data transmitted from another wireless device 1 is input to the reception module 14. In a case where it is determined here that unit data is input, the processing flow proceeds to step A20. On the other hand, in a case where unit data is not input, the process in the present operation cycle is ended.

In step A20, in the sequence number extraction/removal module 15, information associated with a sequence number and a sender attached to the received unit data is extracted. The information extracted here is sent to the duplicate reception counter module 16. In next step A30, in the duplicate reception counter module 16, the number of occurrences of duplicate reception is counted for each sender. For example, in a case where the same sequence number is extracted in a predetermined period of time, the number of occurrences of duplicate reception is cumulatively incremented depending on the number of pieces of same sequence number.

In step A40, in the interference notification packet generation module 17, an interference notification packet is generated. The interference notification packet includes information identifying the wireless device 1 serving as a wireless device on the transmission side and information indicating the number of occurrences of duplicate reception. Furthermore, in step A50, in the sequence number assigning module 12, a sequence number is assigned to the interference notification packet and the resultant interference notification packet is transmitted to the monitoring server 2 via the transmission module 13 and the wireless communication unit 31. Note that the transmission frequency of the interference notification packet may or may not correspond to the operation cycle of the present flow. For example, when the cumulative number of occurrences of duplicate reception counted by the duplicate reception counter module 16 exceeds a predetermined value (for example, 5), the interference notification packet may be generated and transmitted. Alternatively, the interference notification packet may be generated and transmitted periodically at predetermined intervals (for example, once every 24 hours).

3-2. Estimating Location of Interference Source

In step B10 (first process) in FIG. 11, in the data collection module 21, interference notification packets transmitted from wireless devices 1 are collected. More specifically, for example, as illustrated in FIG. 8, information indicating a communication partner device (a wireless device 1 on the transmission side) and information indicating the number of occurrences of duplicate reception are collected for each wireless device 1 and stored in the auxiliary storage device 46.

In next step B20, in the directed graph generation module 22, wireless devices 1 having a number of occurrences of duplicate reception equal to or greater than a predetermined value and nodes corresponding to the selected wireless devices 1 are set as start nodes on a directed graph. More specifically, for example, all wireless devices 1 having a number of occurrences of duplicate reception equal to or greater than 5 are selected. Alternatively, selecting and setting of start nodes may be performed when the amount of information collected in step B10 exceeds a predetermined value. Still alternatively, selecting and setting of start nodes may be performed periodically at predetermined intervals (for example, once every 24 hours).

Steps B30 to B80 are steps performed for each of all start nodes selected in step B20. First, in step B30, an arbitrary one start node is selected from all start nodes. In step B40, an arbitrary one adjacent node is selected from all adjacent nodes adjacent to the selected start node. In step B50, it is determined whether the number of occurrences of duplicate reception at the adjacent node is smaller than the number of occurrences of duplicate reception at the start node. If so, the processing flow proceeds to step B60.

In step B60 (second process), it is determined that the location of the adjacent node is closer to the interference source 4 than the location of the start node is, and thus an arrow link is generated in a direction from the start node to the adjacent node. Thereafter, the processing flow proceeds to step B70. On the other hand, in a case where the answer to step B50 is negative, it is estimated that the location of the adjacent node is not closer to the interference source 4 than the location of start node is, and the processing flow proceeds to step B70.

In step B70, a determination is performed as to whether there is one or more adjacent nodes adjacent to the present start node. In a case where there is one or more such adjacent nodes, the processing flow proceeds to step B40 and one of unselected adjacent nodes is selected as a new adjacent node. In a case where the determination process described above is completed for all adjacent nodes, the processing flow proceeds to step B80. Steps B30 to B80 are performed repeatedly until steps B30 to B70 are completed for all start nodes.

In step B90, a determination is performed as to whether an arrow link extending from a start node to an adjacent node is generated in the above-described process. In a case where it is determined in step B90 that a link is generated, the processing flow proceeds to step B100 but otherwise the processing flow proceeds to step B110. In a case where links are generated only for part of a plurality of start nodes, nodes having no link are set as end nodes and the processing flow proceeds to step B100.

In step B100, a node pointed to by an arrow link is set as new start nodes. Note that in a case where a plurality of links are generated in the above-described process, a plurality of start nodes corresponding to the links are set. The processing flow then proceeds to step B30. As a result of setting new start nodes, nodes located closer to the interference source 4 are obtained on the directed graph, which allows it to reduce the area in which the interference source 4 is supposed to be located.

On the other hand, in step B110, in the location estimation module 23, nodes given as start nodes as of this point of time are set as end nodes, and it is estimated that the interference source 4 is located close to wireless devices 1 corresponding to the end nodes. In a case where a plurality of end nodes are set, it is estimated that the area in which the interference source 4 is located includes these end nodes and includes no other nodes. An estimation result obtained above is, for example, output from an output device of the monitoring server 2.

4. Operation and Effect

Figure 12A:
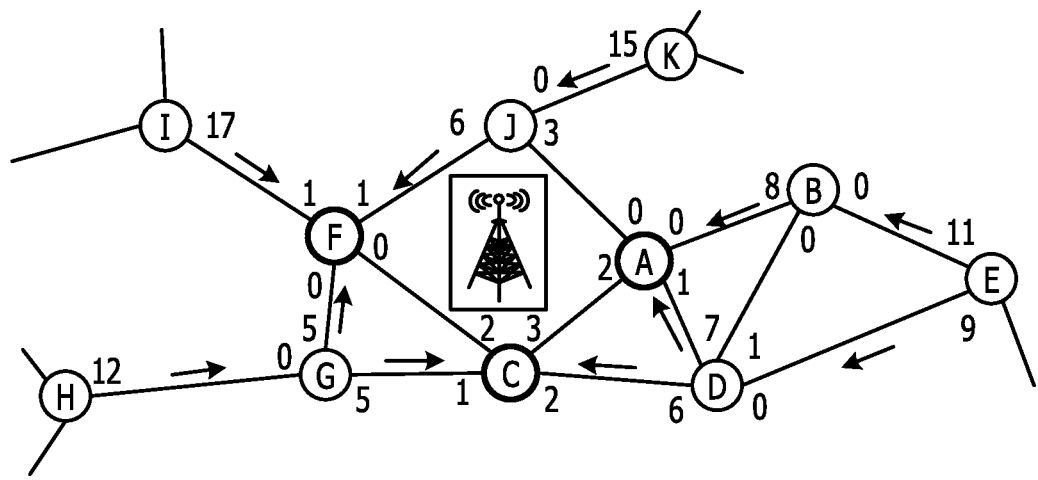
FIGS. 12A and 12B are diagrams for use in describing a control by the server illustrated in FIG. 6, where
Figure 12B:
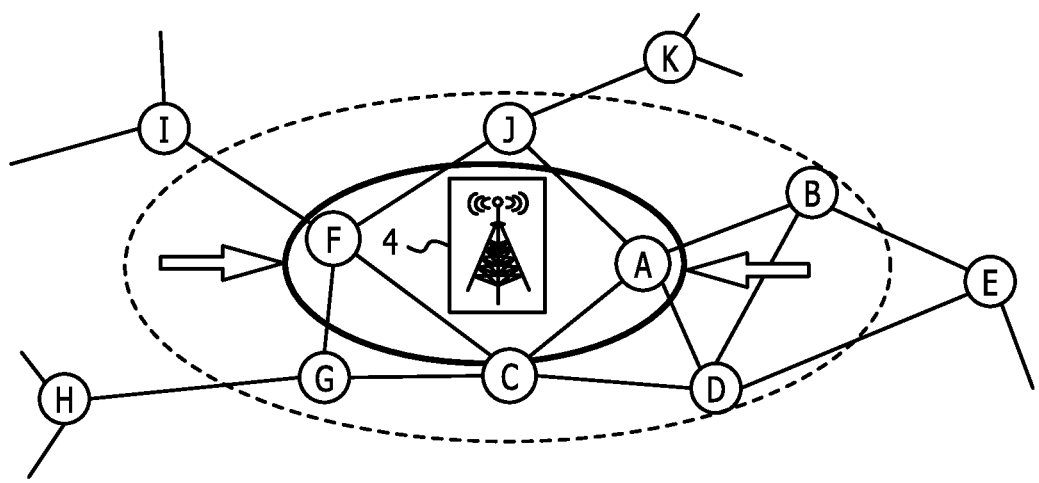

FIGS. 12A and 12B illustrate examples of topological maps of the wireless communication network 10. In FIG. 12A, numbers of occurrences of duplicate reception are represented on the topological map. In FIG. 12A, nodes A to K are represented so as to correspond to locations of respective wireless devices 1.

The number of occurrences of duplicate reception at any wireless device 1 may greatly vary depending on a target communication device even in a case where the distance between the wireless device 1 and the interference source does not vary. For example, in FIG. 12A, the number of occurrences of duplicate reception at a wireless device B is 0 in communication with a wireless device D and a wireless device E. However, the number of occurrences of duplicate reception at the wireless device B is 8 in communication with a wireless device A. Note that the number of occurrences of duplicate reception does not necessarily have a correlation with the distance to the interference source. For example, in FIG. 12A, although the distance of the wireless device A to the interference source 4 is smaller than the distance of the wireless device B to the interference source 4, the number of occurrences of duplicate reception at the wireless device A is smaller than that at wireless device B.

The monitoring server 2 checks the number of occurrences of duplicate reception occurring in communication between a pair of wireless devices 1, and estimates that the interference source 4 is located closer to a wireless device 1 at which a less number of occurrences of duplicate reception is detected than to a wireless device 1 at which a larger number of occurrences of duplicate reception is detected. When each link on the topological map is labelled with an arrow such that the arrow extends from a node at which a larger number of occurrences of duplicate reception is detected toward a node at which a smaller number of occurrences of duplicate reception is detected, then directions of resultant arrows correspond to a direction in which the interference source 4 is located as illustrated in FIG. 12A. That is, any node located at the point of an arrow on the directed graph is closer to the interference source 4 than a node at the tail of the arrow is. Therefore, by comparing the number of occurrences of duplicate reception at each link, as represented by open arrows in FIG. 12B, it is allowed to reduce the area in which the interference source 4 is supposed to be located from a greater area surrounded by a broken line into a smaller area surrounded by a thick line.

(1) In the monitoring server 2 described above, for example, the application program including the data collection module 21 (collection unit) and the location estimation module 23 (estimation unit) is executed thereby to estimate the location of the interference source 4 in the wireless communication network 10. In the location estimation module 23, for any pair of wireless devices 1, it is estimated that the location of the interference source 4 is closer to a wireless device 1 at which a less number of occurrences of duplicate reception is detected than to the other wireless device 1 at which a larger number of occurrences of duplicate reception is detected.

By estimating the location of the interference source 4 based on the correlation between the distance to the interference source 4 and the relative number of occurrences of duplicate reception at wireless devices 1, it is allowed to improve the accuracy of the estimation of the location of the interference source 4, which allows a reduction in the number of steps of searching for the interference source 4. The number of occurrences of duplicate reception may be easily detected by using the application program installed on the wireless device 1. This means that it does not have to change hardware, firmware, drivers, or the like on the wireless device 1, which provides a benefit that the present embodiment has high adaptability to an existing wireless communication system.

(2) In the monitoring server 2, the application program including, for example, the directed graph generation module 22 is executed thereby to estimate the location of the interference source 4 in the wireless communication network 10. For each pair of wireless devices 1, the directed graph generation module 22 determines which one of the wireless devices 1 respectively located on the reception side and transmission side receives greater influence from the interference source 4 based on the number of occurrences of duplicate reception detected at the respective wireless devices 1. Furthermore, the directed graph generation module 22 connects nodes with arrows on the directed graph such that each arrow points to a node at which greater influence is received by the interference source 4. By generating the directed graph associated with the distance between the interference source 4 and the plurality of wireless devices 1 in the above-described manner, it is allowed to accurately identify wireless devices 1 located close to the interference source 4 as illustrated in FIG. 9 and FIG. 12A.

(3) In the location estimation module 23 described above, the area in which the interference source 4 is located is estimated based on the locations of wireless devices 1 corresponding to end nodes on the directed graph. That is, as illustrated in FIG. 9 and FIG. 12A, it is allowed to indicate an area in which the interference source 4 is estimated to be located, close to wireless devices 1 corresponding to end nodes on the directed graph. By performing the estimation in the above-described manner, it is allowed to accurately reduce the area in which the interference source 4 is estimated to be located, which allows it to improve the accuracy of the estimated location of the interference source 4.

5. Modifications

The embodiments are not limited to the examples described above, but various modifications are possible without departing from the scope of the embodiments. The configurations and the processes according to the embodiment may be properly selected or removed or combined as occasion calls. In the embodiments described above, it is assumed by way of example that the estimation is performed as to the interference source 4 in the wireless communication network 10 including wireless devices 1 (smart meters) each having a meter reading device with a wireless communication function for use in an infrastructure facility. However, the wireless device 1 is not limited to the example described above. For example, the wireless device 1 may be a portable telephone device, a smartphone, or the like. In this case, when duplicate reception occurs at a wireless device 1, if the location of the wireless device 1 is determined, it is possible to estimate the location of an interference source 4. Therefore, also in a case where a portable communication terminal is used as a wireless device 1, if a known location information service is used, it is possible to achieve effects similar to those achieved in the embodiments described above. For example the data can includes the location of the wireless device.

In the embodiments described above, it has been assumed by way of example that the location estimation is performed for one interference source 4. Alternatively, locations of a plurality of interference sources 4 may be estimated. Regardless of the number of interference sources 4, each end node on the directed graph such as that illustrated in FIG. 9 is located close to one of the interference sources 4, which allows it to accurately estimate the locations of the interference sources 4.

In the embodiments described above, it is assumed by way of example that the location of the interference source 4 is estimated or determined based on which one of wireless devices at reception and transmission side has a larger number of occurrences of duplicate reception than the other one in each wireless link. In addition, the location of the interference source 4 may be estimated taking into account the difference in the number of occurrences of duplicate reception. More specifically, it may be estimated that the greater the difference in the number of occurrences of duplicate reception, the greater the difference between the distance of one wireless device 1 to the interference source 4 and the distance of the other wireless device 1 to the interference source 4.

Figure 13:
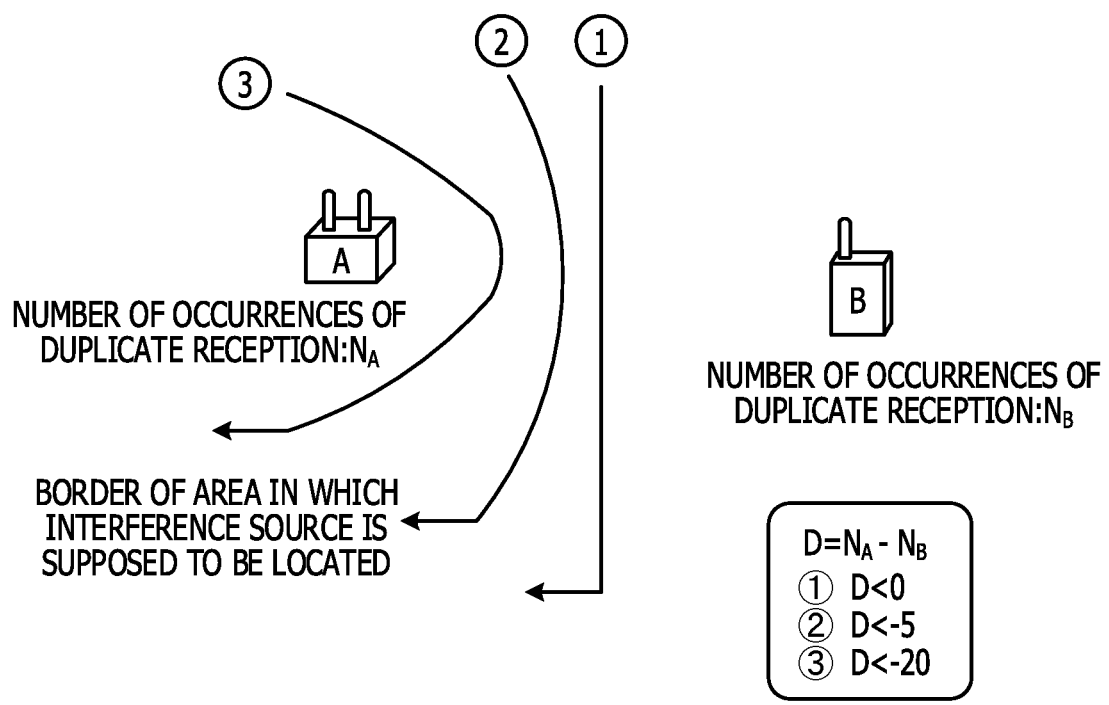
FIG. 13 is a diagram illustrating a relationship between a location of an interference source and a difference in the number of occurrences of duplicate reception.

The estimation based on the difference in the number of occurrences of duplicate reception is described below with reference to FIG. 13. In the following description, it is assumed that a wireless device A is located in an area in which an influence of an interference source appears, while a wireless device B is located outside the area in which the influence of the interference source appears, and a discussion is given on the difference in the number of occurrences of duplicate reception between the wireless devices A and B. In the following description, the number of occurrences of duplicate reception at the wireless device A is denoted by $N_A$, and the number of occurrences of duplicate reception at the wireless device B is denoted by $N_B$. Thus, the difference D in the number of occurrences of duplicate reception is obtained by subtracting $N_B$ from $N_A$, that is, $D=N_A-N_B$. As described above, the number of occurrences of duplicate reception tends to increase at a wireless device 1 located far from the interference source 4, and thus, by definition, the difference D in the number of occurrences of duplicate reception may take negative values.

On the other hand, the greater the degree of influence of the interference source 4 on the wireless device A and the wireless device B, the greater the absolute value of the difference D in number of occurrences of duplicate reception. That is, the greater the absolute value of the difference D in the number of occurrences of duplicate reception, the greater the distance of the wireless device B from the area in which the interference source 4 is supposed to be located, and the greater the difference between the distance of the wireless device A to the interference source 4 and the distance of the wireless device B to the interference source 4. Therefore, a boundary of the area in which the interference source 4 is supposed to be locate may be represented, for example, by a quadratic curve (one of hyperbolic curves) as illustrated in FIG. 13. As described above, based on the correlation between the difference in the number of occurrences of duplicate reception and the difference in the distance of wireless devices 1 to the interference source 4, it is allowed to reduce the area in which the interference source 4 is estimated to be located, which allows an improvement in accuracy in location estimation.

In the embodiments described above, it is assumed by way of example that the location of the interference source 4 is estimated by the monitoring server 2. Alternatively, a similar function may be provided in the base station 3 (managing terminal) or in some wireless device 1. Still alternatively, the process illustrated in FIG. 7 may be executed by some computer connected to the network 5. That, regardless of which device estimates the location of the interference source 4, it is possible to achieve effects similar to those achieved in the embodiments described above.

In the embodiments described above, it is assumed by way of example that the functions illustrated in FIG. 4 or FIG. 7 are realized by software stored in the auxiliary storage device 36 or 46 or a removal medium. However, the software may be stored in other types of computer-readable storage media such as a flexible disk, a CD, a DVD, a Blue-ray Disk, or the like. In this case, to use the program, a computer may read out the program from the storage medium and transfer the program into an internal storage device or an external storage device. In the embodiments described above, it is assumed by way of example that the functions illustrated in FIG. 4 or FIG. 7 is realized by software. Alternatively, part or all of the functions may be realized by hardware (a logic circuit).

The program described above includes program codes to realize the functions of the data collection module 21, the directed graph generation module 22, and the location estimation module 23 according to the embodiment. Part of the functions may be realized not by the application program but by an operating system (OS), firmware or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication network system comprising:
   a plurality of wireless devices, each device operates as one of a transmitting wireless device or a receiving wireless device;
      wherein the receiving wireless device configured to receive data from the transmitting wireless device and to return a reception acknowledgement signal to the transmitting wireless device after receiving the data;
      wherein the transmitting wireless device configured to transmit the data to the receiving wireless device and to retransmits the data to the receiving wireless device when the reception acknowledgement signal does not reach the transmitting wireless device;
   a location estimation device comprising:
      a processor; and
      a memory which stores a plurality of instructions, which when executed by the processor, cause the processor to execute:
      collecting information, for each wireless device in a pair of wireless devices communicating with each other in the wireless communication network, as to the number of occurrences of duplicate reception caused by the data retransmission performed when the reception acknowledgement does not reach the transmitting wireless device; and
      estimating the location of an interference source of radio wave in a wireless communication network based on the collected information as to the number of occurrences of duplicate reception such that the location of the interference source is closer to one of wireless devices in the pair with a less number of occurrences of duplicate reception than to the other one of the wireless devices in the pair with a larger number of occurrences of duplicate reception.

2. The system according to claim 1, further comprising:
   generating a topology corresponding to a connection state of the wireless communication network,
   wherein the topology is generated in the form of a directed graph in which nodes are connected by an arrow extending from a node corresponding to a wireless device having a larger number of occurrences of duplicate reception to a node corresponding to a wireless device having a less number of occurrences of duplicate reception.

3. The system according to claim 2,
wherein the estimating includes estimating an area in which the interference source exists, based on a location of a wireless device corresponding to an end node of the generated directed graph.

4. The system according to claim 1,
wherein the estimating is performed such that the greater the difference in the number of occurrences of duplicate reception between the wireless devices in the pair, the greater the difference between the distance of one wireless device in the pair to the interference source and the distance of the other wireless device in the pair to the interference source.

5. The system according to claim 1,
wherein the data further includes the location of the wireless device,
wherein the collecting further collects the location of the wireless device from the data.

6. A location estimation device configured to estimate a location of an interference source of radio wave in a wireless communication network, the wireless communication network including a plurality of wireless devices configured to transmit and receive data to and from each other, the wireless communication network configured such that in a case where a reception acknowledgement signal returned from a wireless device operating as a receiving wireless device in response to receiving data does not reach a wireless device operating as a transmitting wireless device, the wireless device operating as the transmitting wireless device retransmits the data to the wireless device operating as the receiving wireless device, the location estimation device comprising:
a processor; and
a memory which stores a plurality of instructions, which when executed by the processor, cause the processor to execute:
collecting information, for each wireless device in a pair of wireless devices communicating with each other in the wireless communication network, as to the number of occurrences of duplicate reception caused by the data retransmission performed when the reception acknowledgement signal returned from a wireless device operating as a receiving wireless device does not reach a wireless device operating as a transmitting wireless device; and
estimating the location of the interference source based on the collected information as to the number of occurrences of duplicate reception such that the location of the interference source is closer to one of wireless devices in the pair with a less number of occurrences of duplicate reception than to the other one of the wireless devices in the pair with a larger number of occurrences of duplicate reception.

7. The device according to claim 6, further comprising:
generating a topology corresponding to a connection state of the wireless communication network,
wherein the topology is generated in the form of a directed graph in which nodes are connected by an arrow extending from a node corresponding to a wireless device having a larger number of occurrences of duplicate reception to a node corresponding to a wireless device having a less number of occurrences of duplicate reception.

8. The device according to claim 7,
wherein the estimating includes estimating an area in which the interference source exists, based on a location of a wireless device corresponding to an end node of the generated directed graph.

9. The device according to claim 6,
wherein the estimating is performed such that the greater the difference in the number of occurrences of duplicate reception between the wireless devices in the pair, the greater the difference between the distance of one wireless device in the pair to the interference source and the distance of the other wireless device in the pair to the interference source.

10. The device according to claim 6,
wherein the data further includes the location of the wireless device,
wherein the collecting further collects the location of the wireless device from the data.

11. A method of estimating a location of an interference source of radio wave in a wireless communication network, the wireless communication network including a plurality of wireless devices configured to transmit and receive data to and from each other, the wireless communication network configured such that in a case where a reception acknowledgement signal returned from a wireless device operating as a receiving wireless device in response to receiving data does not reach a wireless device operating as a transmitting wireless device, the wireless device operating as the transmitting wireless device retransmits the data to the wireless device operating as the receiving wireless device, the method comprising:
collecting information, for each wireless device in a pair of wireless devices communicating with each other in the wireless communication network, as to the number of occurrences of duplicate reception caused by the data retransmission performed when the reception acknowledgement signal returned from a wireless device operating as a receiving wireless device does not reach a wireless device operating as a transmitting wireless device; and
estimating, by a computer processor, the location of the interference source based on the collected information as to the number of occurrences of duplicate reception such that the location of the interference source is closer to one of wireless devices in the pair with a less number of occurrences of duplicate reception than to the other one of the wireless devices in the pair with a larger number of occurrences of duplicate reception.

12. The method according to claim 11, further comprising:
generating a topology corresponding to a connection state of the wireless communication network,
wherein the topology is generated in the form of a directed graph in which nodes are connected by an arrow extending from a node corresponding to a wireless device having a larger number of occurrences of duplicate reception to a node corresponding to a wireless device having a less number of occurrences of duplicate reception.

13. The method according to claim 12,
wherein the estimating includes estimating an area in which the interference source exists, based on a location of a wireless device corresponding to an end node of the generated directed graph.

14. The method according to claim 11,
wherein the estimating is performed such that the greater the difference in the number of occurrences of duplicate reception between the wireless devices in the pair, the greater the difference between the distance of one wireless device in the pair to the interference source and the distance of the other wireless device in the pair to the interference source.

15. The method according to claim 11,
wherein the data further includes the location of the wireless device,
wherein the collecting further collects the location of the wireless device from the data.

* * * * *